Feb. 27, 1968  T. R. GONDERT ET AL  3,370,883
AUTOMOTIVE VEHICLE BODY
Filed Dec. 29, 1965
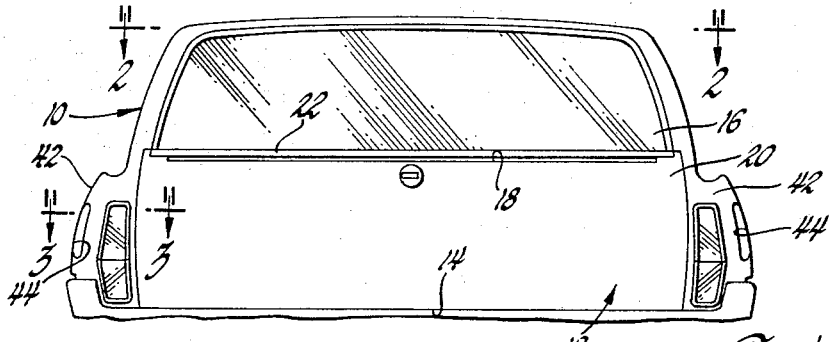
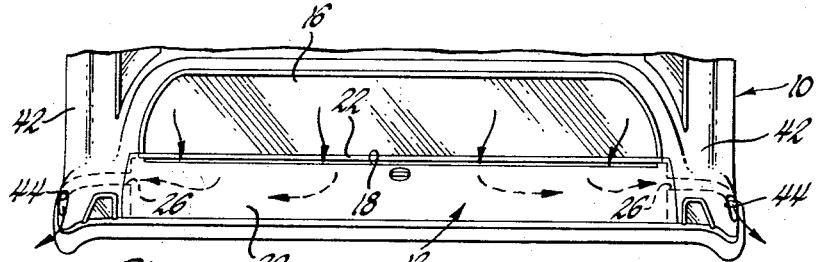
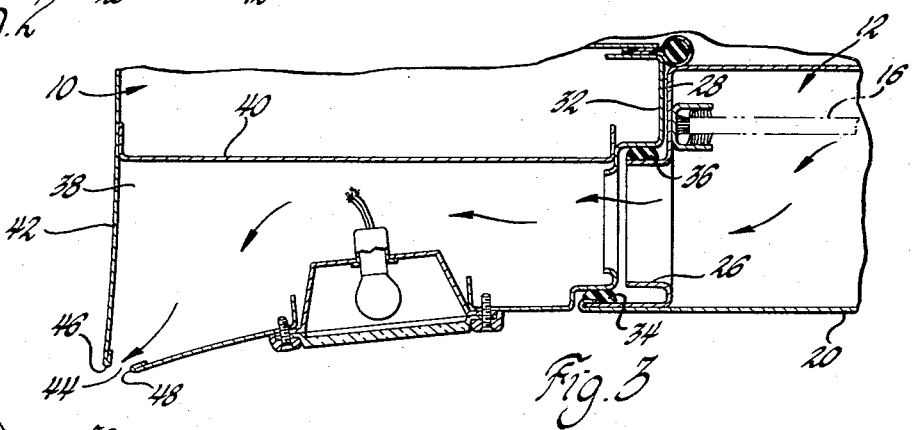
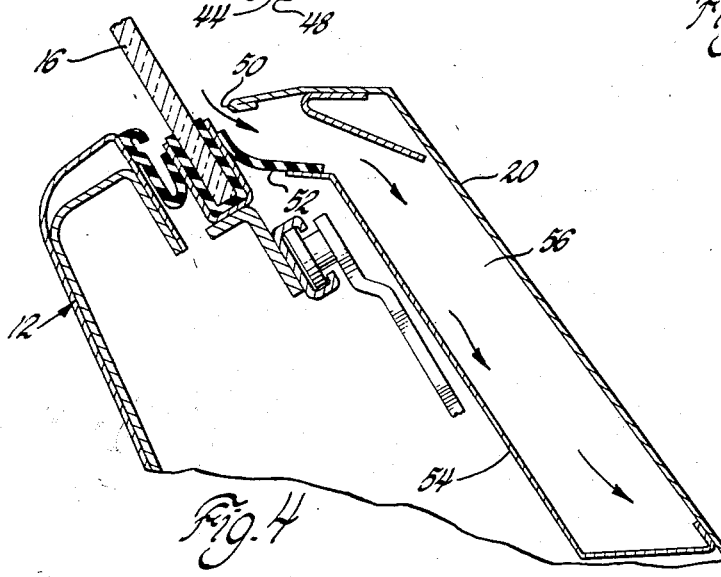
INVENTORS
Theodore R. Gondert
& Johann G. Kuhn
W. S. Pettigrew
ATTORNEY

United States Patent Office 3,370,883
Patented Feb. 27, 1968

3,370,883
AUTOMOTIVE VEHICLE BODY
Theodore R. Gondert, Romeo, and Johann G. Kuhn, Madison Heights, Mich., assignors to General Motors Corporation, Detroit, Mich., a corporation of Delaware
Filed Dec. 29, 1965, Ser. No. 517,302
2 Claims. (Cl. 296—1)

ABSTRACT OF THE DISCLOSURE

In a station wagon style automotive vehicle body including a rearward portion provided with a tailgate and a tailgate window, a suction slot is provided in the tailgate adjacent the lower edge portion of the tailgate window and is operative to such exterior air adjacent the rear end of the vehicle body into the tailgate to improve the air flow pattern over the tailgate window and other rear body portions when the vehicle is in motion. The exterior air is drawn into the tailgate by aspirator orifices located at the sides of the vehicle adjacent streamline flow thereover and connecting with the suction slot through duct work in the tailgate and rear body portion.

---

Although recent automotive vehicle bodies have generally exhibited a high degree of aerodynamic refinement for improved appearance and performance, certain basic requirements of particular body styles inhibit streamlining to the fullest desired degree. A notable example is that of the station wagon style wherein the interior dimensions for rear headroom or cargo normally dictate that the contour of the trailing or rearward portions of the body must fall off so sharply that a very substantial bluff body turbulent wake is generated at high road speeds. Among the various problems that arise, there is the specific long troublesome phenomena of the fouling of the conventional tailgate or other rear window of the body resulting from the lifting and carrying of road debris and dust, moisture, etc., into the turbulent mixing of air over the rear window.

By the present invention, the turbulent mixing of debris carrying air over the rear window and deposition thereon is greatly retarded or completely eliminated through the provision of suction slot means adjacent the window. By suction of exterior air, the slot means are operative to maintain substantially streamlined, attached air flow over a greater part of the rear body portions and the window than would occur absent the slot means, whereby to prevent the debris carrying turbulent air from reaching the area of the rear window.

In accordance with a further object of the invention, the suction for the slot means is generated aerodynamically by air flow over a portion of the body not subject to the turbulent wake, with ducting means being provided within the body to interconnect the slot means and the area of suction generation.

The foregoing and other objects and features of the invention will be readily apparent from the following specification and the drawings wherein:

FIGURE 1 is a fragmentary view of a station wagon style vehicle body incorporating suction slot means according to the present invention;

FIGURE 2 is a fragmentary plan view taken in the direction indicated by line 2—2 of FIGURE 1;

FIGURE 3 is an enlarged sectional view taken generally along the plane indicated by line 3—3 of FIGURE 1; and FIGURE 4 is a vertical longitudinal sectional view through a station wagon body showing a second embodiment of suction slot means according to the invention.

Referring now particularly to FIGURES 1 through 3, there is shown the rear end portion of a station wagon style vehicle body, designated generally as 10, and including a conventional tailgate 12 hingedly mounted adjacent its lower edge 14 for movement about a transverse axis between a lowered position, not shown, and a raised position as shown. The tailgate conventionally carries for vertical sliding movement therein between open and closed positions a tailgate window 16. In the raised or closed position of the window, its upper and side edges are suitably engaged within channel or similar seal means in the marginal edge portions of the upper body portion defining the window opening.

As indicated in FIGURE 2, the rearward portion of the body containing the tailgate 12, the tailgate itself, and the tailgate window 16 typically are provided with a contour somewhat curved from top to bottom for pleasing appearance. While this curvature will vary from model to model, it is generally the case that these rearward or trailing portions, taken with the remaining overall shape of the body 10, exhibit the essentials of an aerodynamic bluff body characterized by a separation of the substantially streamline flow over the top of the body from the body at some point on the rearward contour thereof, generally adjacent the upper edge portion of the tailgate window 16 when closed. Concomitant with this flow separation is a reverse or upward and inward flow from the bottom and the side portions of the vehicle body toward the area of flow separation, ultimately giving rise to a very substantially turbulent wake. It is common experience that the resulting turbulence or mixing of air over the rearward portions of the body carries with it sufficient amounts of debris, moisture, etc., as to result in a thick film on the window 16 to the extent that observation therethrough may be quite difficult.

In accordance with the present invention, there is provided in the tailgate 12 adjacent the lower edge of window 16 a relatively narrow transversely extending suction slot 18. In the construction of FIGURES 1 through 3, this slot is provided directly in the tailgate outer panel 20 and adjacent the lower window reveal molding 22. The tailgate is conventionally of completely closed box-like construction and accordingly provides a plenum chamber with which the slot 18 communicates. As indicated in FIGURE 2, the plenum thus defined extends generally throughout the width of the tailgate and has at either end thereof a ducting outlet 26 formed by suitable rectangular or like flanging in either tailgate jamb panel 28, FIGURE 3. In the closed position of the tailgate, outlets 26 are directly juxtaposed with complementary inlet orifices formed in the opposing jamb panels 32 of the body 10. Suitable sealing provisions around the inlet and outlet orifices may take the form of vertical strips 34 and 36 on adjacent flange portions of the body jamb panel 32, running vertically of the body, together with whatever additional seals are necessary to close the orifices for direct communication.

The inlet orifice in each jamb panel 32 opens to a further plenum chamber 38 defined exteriorly by the body rear quarter outer panel 42 and by an adjoined plenum panel 40 within the quarter. As seen best in FIGURES 1 and 3, each rear quarter panel 42 is provided with an aspirator orifice 44 generally at the rear quarter corner of the body. As best shown in FIGURE 3, the orifice is partially defined by a flanged leading edge 46 formed as a discontinuity in the relatively flat side portion of the quarter panel, and by a somewhat rearwardly and inwardly displaced trailing edge 48 in the rear portion of the quarter panel. As is known, such disposition of the edge discontinuities forming the orifice in relation to substantially streamline air flow over the flat side portion of the quarter panel tends toward a cavitation or fluid flow sink localized generally to the orifice, whereby to effect an aspiration to the exterior of the body of the air contained within the plenum 38 and, consequently, of that within the plenum in the tailgate 12. The result will be a suction of the exterior air overlying the tailgate 12 and tailgate window 16 into the slot 18. The suction, as experimentally observed, will intercept and reduce the force of the generally upstream mixing flow coming from the bottom and sides of the body toward the upper rear end portion thereof. Accordingly, there is a reduction of the retardation and induced separation effect that such flow has on the substantially streamline flow over the top of the body to the point where this streamline flow will remain attached to and wipe all or a substantial portion of the area of the tailgate window 16 thereby to keep the same clean and free of the upward debris carrying air flow or turbulence. The degree of pressure differential or suction produced is, of course, dependent upon the relative speed of air adjacent the aspirator orifices 44. However, as the tendency toward flow separation and turbulent mixing over the tailgate window is likewise dependent on the speed of the vehicle, the beneficial sucking effect through the slot will persist generally throughout the speed range.

In FIGURE 4, there is shown a modification of suction slot means according to the invention with like numerals denoting like parts. Rather than providing the suction slot directly in the tailgate outer panel 20 as in the previous embodiment, it may be formed by the conventional gap 50 between the plane of the tailgate window 16 and the upper somewhat forwardly extending flanged edge of the outer panel. Instead of the usual mounting of a window wiping seal on this flanged edge, a wiping seal member 52 is mounted adjacent one edge thereof to a flange of a plenum panel 54 suitably fixed to the outer panel 20. Again, plenum panel 54 defines with outer panel 20 and jamb panels 28 of the tailgate a closed plenum chamber 56 communicated with the gap 50. The suction ducting for this plenum, as by outlets 28, is similar to the previous embodiment. A further advantage to this modified construction is the limiting of dust and water intake, etc., directly to the plenum 56 and associated ducting, since seal 52 prevents entry to the remaining cavity of the tailgate 12 containing the window regulator or other mechanisms.

It will be understood that various other changes may be made to the suction slot means specifically shown herein. Such changes may be made to conform with the peculiar aerodynamic characteristics of an individual vehicle body style. For example, we have experimentally seen that the flow separation and turbulent mixing phenomena over the tailgate windows are at times more pronounced over the respective side or end portions thereof which are subject to the interaction of high speed flow from over the top and from the respective sides of the body. In this situation, the suction slots may be plural and located generally to those side portions of the window whereby to localize the suction effect. It may also be desirable to isolate one slot or side of slot from the other by separating the tailgate plenum into two distinct portions each respective to one of the aspirator orifices 44.

Further, it is equally feasible that instead of aspirator orifices 44, there may be provided some other aerodynamic suction device responsive to the motion of the vehicle, such as venturis subjected to high speed streamline air flow and communicated to the plenum 38. Power-operated suction means may also be used. The over-all opening area of the slot 18 and the aspirating orifices 44, if used, are subject to experiment for best results, depending primarily upon the operating speed range involved and the natural flow detachment and turbulent wake characteristics of the body without the slot means.

Having thus described our invention, what is claimed is:

1. In combination with a vehicle body having a rear portion thereof subject to a turbulent wake on the exterior thereof when the body is in motion, a swingably mounted tailgate, and a window adjacent said tailgate, suction slot means formed in said tailgate adjacent said window aerodynamic suction means in said body at locations therein remote from said slot and subject to the relatively moving air flow over the body when the latter is in motion, said aerodynamic suction means being operative to partake of such relatively moving air flow to provide an air flow sink, and duct means within said tailgate and said body interconnectable to communicate said slot means with the air flow sink of said aerodynamic suction means whereby to draw exterior air adjacent said window through said slot means and retard turbulent mixing of air over said window.

2. The combination recited in claim 1 wherein said aerodynamic suction means comprise means forming aspirator orifices in said body at exterior locations therein exposed to substantially streamlined airflow thereover when the body is in motion, said orifice forming means being arranged relative to the streamline flow to provide said airflow sink.

References Cited

UNITED STATES PATENTS

| 1,435,490 | 11/1922 | Mitchell | 296—1 |
| 2,223,378 | 12/1940 | Martin | 296—91 |
| 2,361,924 | 11/1944 | Boynton | 296—1 |
| 3,097,882 | 7/1963 | Andrews | 296—91 |
| 2,199,883 | 5/1940 | Ishiwata | 296—91 X |

FOREIGN PATENTS 742,482    5/1953   Germany.

BENJAMIN HERSH, *Primary Examiner.*

PHILIP GOODMAN, *Examiner.*